US011352522B2

(12) United States Patent
Deighton et al.

(10) Patent No.: US 11,352,522 B2
(45) Date of Patent: Jun. 7, 2022

(54) WATER-BASED INKS WITH HIGH RENEWABLE CONTENT

(71) Applicant: SUN CHEMICAL CORPORATION, Parsippany, NJ (US)

(72) Inventors: Robert Deighton, Halifax (GB); Stewart Carson, Bolton (GB)

(73) Assignee: Sun Chemical Corporation, Parsippany, NJ (US)

( * ) Notice: Subject to any disclaimer, the term of this patent is extended or adjusted under 35 U.S.C. 154(b) by 86 days.

(21) Appl. No.: 16/636,771

(22) PCT Filed: Aug. 14, 2018

(86) PCT No.: PCT/US2018/046616
§ 371 (c)(1),
(2) Date: Feb. 5, 2020

(87) PCT Pub. No.: WO2019/036416
PCT Pub. Date: Feb. 21, 2019

(65) Prior Publication Data
US 2020/0377762 A1 Dec. 3, 2020

Related U.S. Application Data

(60) Provisional application No. 62/546,707, filed on Aug. 17, 2017.

(51) Int. Cl.
*C09D 193/04* (2006.01)
*C09D 11/107* (2014.01)
*C09D 11/102* (2014.01)
*C09D 11/08* (2006.01)
*C09D 11/03* (2014.01)

(52) U.S. Cl.
CPC ............ *C09D 193/04* (2013.01); *C09D 11/03* (2013.01); *C09D 11/08* (2013.01); *C09D 11/102* (2013.01); *C09D 11/107* (2013.01)

(58) Field of Classification Search
None
See application file for complete search history.

(56) References Cited

U.S. PATENT DOCUMENTS

| 3,274,141 | A | 9/1966 | Gustav et al. | |
| 5,166,245 | A | 11/1992 | Zuraw | |
| 7,291,697 | B2* | 11/2007 | Fontana ............... | C08F 283/06 530/200 |
| 8,383,705 | B2 | 2/2013 | Wallack et al. | |
| 8,519,022 | B2 | 8/2013 | Wallack et al. | |
| 9,382,659 | B2 | 7/2016 | Apostol et al. | |
| 10,385,221 | B2* | 8/2019 | Van Helmond ...... | C09D 143/04 |
| 2006/0086285 | A1 | 4/2006 | Williams | |
| 2006/0219130 | A1 | 10/2006 | Allison | |
| 2014/0139595 | A1 | 5/2014 | Hong et al. | |

FOREIGN PATENT DOCUMENTS

| CN | 102516845 A | 6/2012 |
| JP | 2004346329 A | 12/2004 |
| JP | 20065204418 A | 9/2006 |
| JP | 2008545824 A | 12/2008 |
| JP | 2011094104 A | 5/2011 |
| WO | WO 2009/068462 A1 | 6/2009 |
| WO | WO 2016/028850 A1 | 6/2016 |
| WO | WO2017011236 A1 | 1/2017 |

OTHER PUBLICATIONS

Englihs abstract of CN 106243868 A, 8 pages, Dec. 21, 2016, China.*
Englihs abstract of CN 106243996 A, 5 pages, Dec. 21, 2016, China.*
Office Action issued in counterpart Australian application No. 2018318952, dated May 5, 2021.
Office Action issued in counterpart Philipenes application No. 1/2020/500322, dated May 31, 2021.
Office Action issued in counterpart Indian application No. 202047006140, dated Jun. 7, 2021.
International Search Report issued in International Application No. PCT/US18/46616, dated Oct. 16, 2018.
Written Opinion of the International Searching Authority issued in International Application No. PCT/US18/46616, dated Oct. 16, 2018.
International Preliminary Report on Patentability (Chapter II of the Patent Cooperation Treaty) issued in International Application No. PCT/US18/46616, dated Sep. 30, 2019.
Office Action issued in counterpart Columbian Application No. Supplementary European Search Report issued in counterpart EP Application No. NC2020/0001728, dated Feb. 25, 2021.
Supplementary European Search Report issued in counterpart EP Application No. EP 18 84 5620, dated Apr. 14, 2020.
Second Office Action issued in counterpart Columbian No. NC2020/0001728, dated Aug. 23, 2021 with English language summary.
Office Action issued in counterpart Japanese application No. 2020-506357, dated Jul. 29, 2021 with English language summary.
Office Action issued in counterpart Chinese application No. 201880053375.0, dated Jun. 23, 2021 with English language summary.
"Oil Prices and the Fate of Bioplastics in the Marketplace" downloaded from: (https://www.plasticstodaycornlbiopolymers/oil-prices-and-fate-bioplastics-marletplace), Jan. 10, 2022.
"Market Trends on Bio-based and Plant-based Resins" downloaded from https://coatings.specialchem.corn/tech-library/arficle/market-trends-on-biobased-and-plant-based-resins, Jan. 10, 2022.
"Argus C5 and Hydrocarbon Resins," Argusmedia.com. Copyright 2018 Argus Media Group, Issue 18-1 Jan. 22, 2018.

* cited by examiner

*Primary Examiner* — Tae H Yoon
(74) *Attorney, Agent, or Firm* — Marian E. Fundytus; Ostrolenk Faber LLP.

(57) ABSTRACT

The present invention provides water-based ink and coating compositions having a high renewable resin content. The ink and coating compositions of the invention comprise equal to or greater than 65% (w/w) renewable resins, based on the total combined weight of the resins. Renewable resins derived from gum rosins are preferred. The ink and coating compositions of the present invention exhibit physical properties (e.g. adhesion and resistance) that are as good as, or better than, current commercially available inks (e.g. acrylic based inks not containing renewable material).

22 Claims, No Drawings

WATER-BASED INKS WITH HIGH RENEWABLE CONTENT

CROSS REFERENCE TO RELATED APPLICATIONS

The present application is a § 371 National Phase application based on PCT/US2018/46616 filed Aug. 14, 2018, which claims the benefit of U.S. Provisional Application No. 62/546,707, filed Aug. 17, 2017 the subject matter of each of which is incorporated by reference in their entirety.

FIELD OF THE INVENTION

The present invention is related to printing ink and coating compositions comprising high amounts of renewable content, particularly renewable resins. The renewable content is derived from renewable sources (e.g. plant based), as opposed to fossil fuels.

BACKGROUND OF THE INVENTION

Typically, ink and coating compositions are formulated using polymers/resins as binders for the compositions. Generally, these polymers/resins are prepared from non-renewable resources, such as fossil fuels. However, there is an effort to replace these polymers/resins prepared from non-renewable resources. They are expensive to make, and, because the raw materials (such as fossil fuels) are only available in a finite amount, we will eventually exhaust the supply of raw materials.

As an alternative to the polymers/resins prepared from non-renewable resources, there has been an effort to prepare ink and coating compositions with polymers/resins prepared from renewable resources, such as plant-based. Ideally, ink and coating compositions prepared from renewable resources would have similar resistance properties to current commercially available inks and coatings (especially acrylic inks and coatings). But, although there are some examples of inks made from renewable starches, in particular corn starch, these inks do not have the desired physical properties.

U.S. Pat. Nos. 8,383,705 and 8,519,022 disclose extender compositions for flexographic and other types of ink. The extender compositions contain potato starch, a mono-ethanol amine, and a solution resin that is soluble in water. Potato starch is used as a carrier and an emulsion resin in the final ink composition. The potato starch is used as an alternative to petroleum- and soy-based resins.

U.S. Pat. No. 9,382,659 discloses aqueous printing ink and coating compositions that contain high molecular weight starches and water-soluble acrylic polymers or copolymers as the binder resin. The ink and coating compositions are useful for printing on cellulosic substrates.

Although inks and coatings containing starches have been prepared, there is still a need to develop inks and coatings comprising renewable content that have better performance properties. For example, there is still a need for inks and coatings that exhibit a resistance profile similar to, or better than, existing commercially available inks that do not contain renewable content.

BRIEF SUMMARY OF THE INVENTION

The present invention is drawn to water-based ink and coating compositions with a high renewable resin content (preferably equal to or greater than 65% (w/w)). The inventors have discovered that inks made with high renewable resin derived from gum rosins offer improved resistance properties when compared to inks made with renewable starches. Inks made from starch, particularly corn starch, are well known to be renewable. However, these inks do not have the desired physical properties, such as adhesion and rub resistance.

In a particular aspect, the present invention provides a water based ink or coating composition comprising:
  a) one or more renewable resins;
  b) one or more self-crosslinking acrylics;
  c) one or more crosslinking agents; and
  d) silicone;
wherein the renewable gum rosin resin content is equal to or greater than 65% (w/w), based on the total weight of the resin content in the ink or coating composition.

In certain embodiments, the renewable resins are gum rosin resins. Preferably the gum rosin resins comprise one or more of maleic, fumaric, or polyester renewable resins.

In certain embodiments, the crosslinking agent is zinc oxide, carbodiimide, or combinations thereof.

In certain embodiments, the present invention provides substrates and articles comprising the ink and coating compositions of the present invention.

In certain embodiments, the substrates and articles are suitable for use in packaging applications, such as food packaging.

Other features and advantages of the present invention are described below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention is drawn to water-based ink and coating formulations with a high renewable resin content. Renewable content is defined as material obtained from renewable sources (e.g. plants), as opposed to fossil fuels. For the purposes of the present invention, the percentage of renewable material is calculated as the amount of renewable resin as a percentage of the total resin content in the ink or coating in a dried/cured film. The ink and coating compositions of the present invention preferably comprise equal to or greater than 65% (w/w) renewable resin, based on the total weight of the resin content in a dried/cured film.

In a particular aspect, the present invention provides a water based ink or coating composition comprising:
  a) one or more renewable resins;
  b) one or more self-crosslinking acrylics;
  c) one or more crosslinking agents; and
  d) silicone;
wherein the renewable gum rosin resin content is equal to or greater than 65% (w/w), based on the total weight of the resin content in the ink or coating composition.

Preferably, the renewable resins are gum rosin resins, such as, for example, maleic, fumaric, and polyester renewable resins. Preferably the crosslinking agent is zinc oxide or carbodiimide, or combinations thereof.

The inks and coatings of the present invention could be used for various end-use applications, including in various packaging applications. Packaging applications include food applications, such as carry out bags, beverage cups, wraps, clam shells, cartons, and pinch bottom bags. For example, one particular application would be cold beverage cups.

The inks and coatings of the present invention preferably have a similar, or better, resistance profile as the current commercially available inks (especially acrylic inks), which do not contain a significant amount of renewable material. The inks and coatings of the present invention exhibit excellent resistance to water, grease, carbonated drinks, artificial sweat, rub (friction), and heat.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "ink and coating compositions," "inks and coatings," "inks," "coatings," and "compositions of the invention" are used interchangeably, and all refer to ink and coating compositions of the present invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Compositions

The present invention provides water-based ink and coating compositions containing large amounts of renewable materials, especially renewable resins. The inks and coatings of the invention are suitable for printing on various end-use applications, including different types of packaging and food applications. For example, the inks and coatings of the invention are useful for printing and coating carry out bags, beverage cups, wraps, clam shells, cartons, and pinch bottom bags, as well as many more applications. A particular application would be the printing and/or coating of cold beverage cups.

Advantageously, the inks and coatings of the present invention perform as well as, or better than, currently commercially available inks and coatings based on non-renewable materials, such as resins derived from fossil fuels. For example, the inks and coatings of the present invention have a similar resistance profile to currently available acrylic inks which do not contain a significant amount of renewable material. Advantageously, the inks and coatings of the present invention exhibit good resistance to water, grease, rub, heat, carbonated drinks, and artificial sweat.

The ink and coating compositions of the present invention comprise renewable materials, generally used as binders. Renewable materials include materials from plants, such as potato starch, corn starch, and rosins. Renewable materials include products obtained from pine trees, such as gum rosin, tall oil rosin, and wood rosin. Gum rosins are composed of acids, such as abietic type, and pimaric type, and derivatives thereof. Gum rosin acids include abietic acid, neoabietic acid, palustric acid, levopimaric acid, dihydroabietic acid, pimaric acid, isopimaric acid, and sandaracopimaric. Gum rosins are often used in a modified form. Gum rosins can be esterified with, for example pentaerythritol, to produce polyester resins. Gum rosins can be reacted with acids and/or anhydrides, such as maleic anhydride or fumaric acid, to produce modified renewable resins. Three particularly useful renewable gum rosin materials are maleic, fumaric, and polyesters resins derived from gum rosin feedstocks, though other renewable gum rosins could also be used. Suitable renewable resins, include, but are not limited to: Erkamar 3275, Erkamar 3300, Erkamar 3266, and Erkamar 3270, all supplied Rokra-Kraemer (all maleic resins); Reactol 5145A (polyester resin), HydroRez 3886 (fumaric resin), HydroRez 6200 (fumaric resin), and HydroRez 6500 (fumaric resin), from Lawter; combinations thereof, and the like.

The ink and coating compositions of the invention typically comprise greater than or equal to 65% (w/w) renewable resins, based on the total combined weight of the resins in the compositions. For example, renewable resins may be present in an amount of greater than or equal to 70% (w/w); or greater than or equal to 75% (w/w); or greater than or equal to 80% (w/w); or greater than or equal to 85% (w/w); or greater than or equal to 90% (w/w); or greater than or equal to 95% (w/w), based on the total combined weight of the resins in the composition. In a preferred embodiment, 99% (w/w) of the resin content in the compositions is renewable. Advantageously, the compositions of the invention comprise about 65% (w/w) to about 99% (w/w) renewable resins, based on the total combined weight of the resins in the compositions. For example, the compositions of the invention may comprise about 65% (w/w) to about 95% (w/w) renewable resins, based on the combined weight of the resins in the composition; or about 65% to about 90%; or about 65% to about 85%; or about 65% to about 80%; or about 65% to about 75%; or about 65% to about 70%; or about 70% to about 99%; or about 70% to about 95%; or about 70% to about 90%; or about 70% to about 85%; or about 70% to about 80%; or about 70% to about 75%; or about 75% to about 99%; or about 75% to about 95%; or about 75% to about 90%; or about 75% to about 85%; or about 75% to about 80%; or about 80% to about 99%; or about 80% to about 95%; or about 80% to about 90%; or about 80% to about 85%; or about 85% to about 99%; or about 85% to about 95%; or about 85% to about 90%; or about 90% to about 99%; or about 90% to about 95%; or about 95% to about 99%.

The ink and coating compositions of the invention generally comprise one or more self-crosslinking acrylics. Suitable self-crosslinking acrylics include, but are not limited to, Neocryl XK12 and XK14 (from DSM); AC2714VP (from Alberdingk); AM00035 (from Synthomer); Orgal PO86V (from Organikkimyan); combinations thereof; and the like.

Self-crosslinking polymers contain a functionality which is self-reactive, and thus do not require the use of a separate co-reactant per se. The self-crosslinking polymer is usually in the form of an aqueous dispersion or emulsion and is typically the product of at least two monomers that react with one another. For example, such a polymer may contain both a carbonyl and an amine functional group. Self-crosslinking acrylic polymers may include, for example, binders selected from the group consisting of styrene-acrylic ester copolymer, a styrene/acrylic ester copolymer containing acrylamide groups, and a copolymer based on acrylonitrile, methacrylamide, and acrylic ester. Preferably, the self-crosslinking acrylic polymer is formed from reactive monomers which include at least one monomer selected from methyl acrylic acid (MAA), methyl methacrylate (MMA), butyl acrylate, butyl methacrylate, styrene, and methyl styrene. Advantageously, the self-crosslinking polymer is a styrene/acrylic ester copolymer.

The ink and coating compositions of the invention typically comprise about 1% (w/w) to about to about 35% (w/w) self-crosslinking acrylics, based on the total combined weight of the resins in the composition. Preferably, the compositions comprise about 3% (w/w) to about 7% (w/w) self-crosslinking acrylics, based on the total combined weight of the resins in the composition. For example, the compositions of the invention may comprise about 1% to about 30% (w/w) self-crosslinking acrylics, based on the total combined weight of the resins in the composition; or about 1% to about 25%; or about 1% to about 20%; or about 1% to about 15%; or about 1% to about 10%; or about 1% to about 5%; or about 5% to about 35%; or about 5% to about 30%; or about 5% to about 25%; or about 5% to about 20%; or about 5% to about 15%; or about 5% to about 10%; or about 10% to about 35%; or about 10% to about 30%; or about 10% to about 25%; or about 10% to about 20%; or about 10% to about 15%; or about 15% to about 35%; or about 15% to about 30%; or about 15% to about 25%; or about 15% to about 20%; or about 20% to about 35%; or about 20% to about 30%; or about 20% to about 25%; or about 25% to about 35%; or about 25% to about 30%; or about 30% to about 35%.

The compositions of the invention typically comprise about 5 wt % (w/w) to about 50% (w/w) resins, based on the total weight of the composition. Preferably, the compositions comprise about 15% (w/w) to about 40% (w/w) resins, based on the total weight of the composition. For example, based on the total weight of the composition, the compositions of the invention may contain resins in an amount (w/w) of about 5% to about 45%; or about 5% to about 40%; or about 5% to about 35%; or about 5% to about 30%; or about 5% to about 25%; or about 5% to about 20%; or about 5% to about 15%; or about 5% to about 10%; or about 10% to about 50%; or about 10% to about 45%; or about 10% to about 40%; or about 10% to about 35%; or about 10% to about 30%; or about 10% to about 25%; or about 10% to about 20%; or about 10% to about 15%; or about 15% to about 50%; or about 15% to about 45%; or about 15% to about 40%; or about 15% to about 35%; or about 15% to about 30%; or about 15% to about 25%; or about 15% to about 20%; or about 20% to about 50%; or about 20% to about 45%; or about 20% to about 40%; or about 20% to about 35%; or about 20% to about 30%; or about 20% to about 25%; or about 25% to about 50%; or about 25% to about 45%; or about 25% to about 40%; or about 25% to about 35%; or about 25% to about 30%; or about 30% to about 50%; or about 30% to about 45%; or about 30% to about 40%; or about 30% to about 35%; or about 35% to about 50%; or about 35% to about 45%; or about 35% to about 40%; or about 40% to about 50%; or about 40% to about 45%; or about 45% to about 50%.

Compositions of the invention generally contain about 0.65% (w/w) to about 50% (w/w) renewable resins, based on the total weight of the composition. For example, renewable resins may be present in an amount of about 0.65% (w/w) to about 45% (w/w), based on the total weight of the composition; or about 0.65% to about 40%; or about 0.65% to about 35%; or about 0.65% to about 30%; or about 0.65% to about 25%; or about 0.65% to about 20%; or about 0.65% to about 15%; or about 0.65% to about 10%; or about 0.65% to about 5%; or about 0.65% to about 1%; or about 1% to about 50%; or about or about 1% to about 45%; or about 1% to about 40%; or about 1% to about 35%; or about 1% to about 30%; or about 1% to about 25%; or about 1% to about 20%; or about 1% to about 15%; or about 1% to about 10%; or about 1% to about 5%; or about 5% to about 50%; about 5% to about 45%; or about 5% to about 40%; or about 5% to about 35%; or about 5% to about 30%; or about 5% to about 25%; or about 5% to about 20%; or about 5% to about 15%; or about 5% to about 10%; or about 10% to about 50%; or about 10% to about 45%; or about 10% to about 40%; or about 10% to about 35%; or about 10% to about 30%; or about 10% to about 25%; or about 10% to about 20%; or about 10% to about 15%; or about 15% to about 50%; or about 15% to about 45%; or about 15% to about 40%; or about 15% to about 35%; or about 15% to about 30%; or about 15% to about 25%; or about 15% to about 20%; or about 20% to about 50%; or about 20% to about 45%; or about 20% to about 40%; or about 20% to about 35%; or about 20% to about 30%; or about 20% to about 25%; or about 25% to about 50%; or about 25% to about 45%; or about 25% to about 40%; or about 25% to about 35%; or about 25% to about 30%; or about 30% to about 50%; or about 30% to about 45%; or about 30% to about 40%; or about 30% to about 35%; or about 35% to about 50%; or about 35% to about 45%; or about 35% to about 40%; or about 40% to about 50%; or about 40% to about 45%; or about 45% to about 50%. Suitable renewable resins include, but are not limited to, Erkamar 3275 supplied by Rokra-Kraemer.

Compositions of the invention generally contain about 0.05% (w/w) to about 20% (w/w) self-crosslinking acrylics, based on the total weight of the composition. Preferably, the compositions of the invention comprise about 3% (w/w) to about 7% (w/w) self-crosslinking acrylics. For example, the self-crosslinking acrylics may be present in an amount of about 0.05% (w/w) to about 15% (w/w); or about 0.05% to about 10%; or about 0.05% to about 5%; or about 0.05% to about 1%; or about 0.05% to about 0.5%; or about 0.05% to about 0.1%; or about 0.1% to about 20%; or about 0.1% to about 15%; or about 0.1% to about 10%; or about 0.1% to about 5%; or about 0.1% to about 1%; or about 0.1% to about 0.5%; or about 0.5% to about 20%; or about 0.5% to about 15%; or about 0.5% to about 10%; or about 0.5% to about 5%; or about 0.5% to about 1%; or about 1% to about 20%; or about 1% to about 15%; or about 1% to about 10%; or about 1% to about 5%; or about 5% to about 20%; or about 5% to about 15%; or about 5% to about 10%; or about 10% to about 20%; or about 10% to about 15%; or about 15% to about 20%.

In addition to the renewable resin and the self-crosslinking acrylics, the compositions of the invention may further comprise additional, non-renewable, resins. Suitable additional, non-renewable, resins include, but are not limited to, acrylics, urethanes, vinyls, epoxies, combinations thereof, and the like. The compositions of the invention may also comprise maleic, fumaric and polyester resins that are not derived from gum rosin feedstocks, and which would not comprise a portion of what is considered the renewable resin portion of the formulation.

When present, additional, non-renewable, resins are present in an amount of about 4% (w/w) to about 8% (w/w), based on the total weight of the composition. For example, non-renewable resins may be present in an amount of about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 8%; or about 5% to about 7.5% or about 5% to about 7%; or about 5% to about 6.5%; or about 5% to about 6%; or about 5% to about 5.5%; or about 5.5% to about 8%; or about 5.5% to about 7.5%; or about 5.5% to about 7%; or about 5.5% to about 6.5%; or about 5.5% to about 6%; or about 6% to about 8%; or about 6% to about 7.5%; or about 6% to about 7%; or about 6% to about 6.5%; or about 6.5% to about 8%; or about 6.5% to about 7.5%; or about 6.5% to about 7%; or about 7% to about 8%; or about 7% to about 7.5%; or about 7.5% to about 8%.

The ink and coating compositions of the invention advantageously contain a crosslinking agent, which promotes the crosslinking of the renewable resin. Suitable crosslinking agents include, but are not limited to, zinc oxide, carbodiimide, cupric oxide, magnesium oxide, calcium oxide, glutaraldehyde, glyoxal, borates, potassium persulfate, aluminum chloride, titanium tetrahydrochloride, zinc chloride, combinations thereof, and the like. Preferred crosslinking agents are zinc oxide and carbodiimide.

The compositions of the invention generally contain about 0.5% (w/w) to about 6% (w/w) crosslinking agent, based on the total weight of the composition. Preferably, the compositions of the invention comprise about 3.5% (w/w) to about 5.5% (w/w) crosslinking agents. For example, the crosslinking agent may be present in an amount of about 0.5% (w/w) to about 5.5% (w/w), based on the total weight of the composition; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 6%; or about 1.5% to about 5.5% ; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 6%; or about 3% to about 5.5%; or about 3% to about 5%; or about 3% to about 4.5%; or about 3% to about 4%; or about 3% to about 3.5%; or about 3.5% to about 6%; or about 3.5% to about 5.5%; or about 3.5% to about 5%; or about 3.5% to about 4.5%; or about 3.5% to about 4%; or about 4% to about 6%; or about 4% to about 5.5%; or about 4% to about 5%; or about 4% to about 4.5%; or about 4.5% to about 6%; or about 4.5% to about 5.5%; or about 4.5% to about 5%; or about 5% to about 6%; or about 5% to about 5.5%; or about 5.5% to about 6%.

The compositions of the present invention comprise a silicone. Silicones can be in liquid or solid form, or can be emulsions or dispersions. Preferably, the silicone is in the form of a silicone emulsion. Suitable silicones include, but are not limited to, polydimethylsiloxanes, and derivatives thereof.

The compositions of the invention typically comprise about 0.5% (w/w) to about 2% (w/w) silicone, based on the total weight of the composition. For example silicone can be present in an amount of about 0.5% (w/w) to about 1.5% (w/w), based on the total weight of the composition; or about 0.5% to about 1%; or about 1% to about 2%; or about 1% to about 1.5%; or about 1.5% to about 2%.

The compositions of the invention may further comprise one or more coalescents. Coalescents optimize film formation. Coalescents function as temporary plasticizers for the polymer particle, and reduce the minimum film formation temperature (MFFT) of the polymer emulsion. Common coalescents include solvents such as ester alcohols, esters, and glycol ethers. Examples of such solvent coalescents include, but are not limited to, Eastman Texanol ester alcohol, Eastman EEH solvent, and Eastman DB solvent. Low Tg acrylic emulsions may also be used as coalescents. Advantageously, the coalescent used in the present invention is an acrylic emulsion, typically having a Tg of less than 20° C., preferably less than 0° C. Suitable coalescents include, but are not limited to, Dow Lucidene 605, DSM NeoCryl A-1125, NeoCryl A-2095, BASF Joncryl 8052, and BASF Joncryl ECO 2124.

When present, coalescents are typically present in an amount of about 1% (w/w) to about 2% (w/w), based on the total weight of the composition. For example, coalescents may be present in an amount of about 1% (w/w) to about 1.5% (w/w), based on the total weight of the composition; or about 1.5% to about 2%.

The compositions of the invention may further comprise colorants. Suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 138, 150, 155, 174, 180, 181, 188; Pigment Red Numbers 2, 22, 23, 48:1, 48:2, 52, 52:1, 53, 57:1, 112, 122, 166, 170, 176, 184, 202, 254, 266, 269; Pigment Orange Numbers 5, 16, 34, 36; Pigment Blue Numbers 15, 15:3, 15:4; Pigment Violet Numbers 3, 19, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

When present, colorants are typically present in an amount of about 6% (w/w) to about 15% (w/w), based on the weight of the total composition. For example, colorants may be present in an amount of about 6% to about 14%; or about 6% to about 13%; or about 6% to about 12%; or about 6% to about 11%; or about 6% to about 10%; or about 6% to about 9%; or about 6% to about 8%; or about 6% to about 7%; or about 7% to about 15%; or about 7% to about 14%; or about 7% to about 13%; or about 7% to about 12%; or about 7% to about 11%; or about 7% to about 10%; or about 7% to about 9%; or about 7% to about 8%; or about 8% to about 15%; or about 8% to about 14%; or about 8% to about 13%; or about 8% to about 12%; or about 8% to about 11%; or about 8% to about 10%; or about 8% to about 9%; or about 9% to about 15%; or about 9% to about 14%; or about 9% to about 13%; or about 9% to about 12%; or about 9% to about 11%; or about 9% to about 10%; or about 10% to about 15%; or about 10% to about 14%; or about 10% to about 13%; or about 10% to about 12%; or about 10% to about 11%; or about 11% to about 15%; or about 11% to about 14%; or about 11% to about 13%; or about 11% to about 12%; or about 12% to about 15%; or about 12% to about 14%; or about 12% to about 13%; or about 13% to about 15%; or about 13% to about 14%; or about 14% to about 15%.

The compositions of the invention may further comprise typical additives used in ink and coating compositions. Suitable additives include, but are not limited to, adhesion promoters, light stabilizers, de-gassing additives, waxes, ammonia, flow promoters, defoamers, antioxidants, stabilizers, surfactants, dispersants, plasticizers, rheological additives, waxes, and combinations thereof. Additives, when used, are each independently included in an amount of about 0.5% (w/w) to about 9% (w/w), based on the total weight of the composition. For example, additives may be present in an amount of about 0.5% (w/w) to about 8.5% (w/w), based on the total weight of the composition; or about 0.5% to about 8%; or about 0.5% to about 7%; or about 0.5% to about 6%; or about 0.5% to about 5%; or about 0.5% to about 4%; or about 0.5% to about 3%; or about 0.5% to about 2%; or about 0.5% to about 1%; or about 1% to about 9%; or about 1% to about 8%; or about 1% to about 7%; or about 1% to about 6%; or about 1% to about 5%; or about 1% to about 4%; or about 1% to about 3%; or about 1% to about 2%; or about 2% to about 9%; or about 2% to about 8%; or about 2% to about 7%; or about 2% to about 6%; or about 2% to about 5%; or about 2% to about 4%; or about 2% to about 3%; or about 3% to about 9%; or about 3% to about 8%; or about 3% to about 7%; or about 3% to about 6%; or about 3% to about 5%; or about 3% to about 4%; or about 4% to about 9%; or about 4% to about 8%; or about 4% to about 7%; or about 4% to about 6%; or about 4% to about 5%; or about 5% to about 9%; or about 5% to about 8%; or about 5% to about 7%; or about 5% to about 6%; or about 6% to about 9%; or about 6% to about 8%; or about 6% to about 7%; or about 7% to about 9%; or about 7% to about 8%; or about 8% to about 9%.

Although the ink and coating compositions of the present invention are water-based, it would be possible to incorporate small amounts of organic solvents into the formulation. Preferably, any organic solvents would be present in an amount of less than or equal to 20% (w/w), more preferably less than or equal to 10% (w/w), and most preferably less than or equal to 5% (w/w), based on the total weight of the composition. In certain embodiments, the compositions of the present invention do not contain any organic solvents.

When applied to a substrate and dried, the inks and coatings of the invention (dried ink film) preferably exhibit similar, or improved, physical properties (e.g. adhesion, resistance) compared to prior art ink (e.g. acrylic based inks) that do not contain a large quantity of renewable materials. Examples of preferred resistance properties include resistance to water, grease, rub (friction), heat, carbonated liquids, and artificial sweat.

EXAMPLES

The following examples illustrate specific aspects of the present invention, and are not intended to limit the scope thereof in any respect, and should not be so construed.

Methods

Ink Preparation

The inventive technical varnish was mixed with a standard acrylic base containing the pigment dispersion (1-35% solids), in amounts such that the final ink contained at 65% renewable resin, based on the total combined weight of the resins (in a dried/cured ink film). Note that it would also be possible to prepare the inks by combining all of the raw materials from scratch, rather than from blending a base (varnish) plus a pigment dispersion. The inventive and comparative inks generally had a viscosity of about 15 seconds using Zahn 3 cup.

Printing

The inventive and comparative inks were printed onto standard polyethylene coated board, using a 200 screen hand anilox roller.

Tape Adhesion

Scotch 610 adhesive tape was applied to the printed and dried sample. The tape was manually pulled off, with a slow pull, followed by a fast pull, in a direction perpendicular to the surface of the print. The tape was pulled off immediately once it had been applied. The results are reported as a percentage of ink removal.

Satra Wet Rub

Using a Satra rub tester (Model STM 461), a liquid soaked felt pad (26 mm OD) under a specified load (1.8 Kg) was rotated on the surface of the print. The prints were tested with water and squalene (artificial sweat). When the pad was soaked with water, the results are reported as the number of rubs to removal of the ink. When the pad was soaked with squalene (i.e. artificial sweat), the pad was rotated for 30 cycles, and the results are reported as a percentage of ink removal.

Sutherland Rub Test (ASTM D5264)

Printed samples were tested using a Sutherland Rub Tester (make, model?). The test sample was attached to the base rubber pad of the rub tester. Dry and wet rub tests were conducted.

For the dry rub test, a dry felt pad was attached to the top (receptor) rubber pad of the rub tester. The rub tester was set to perform 100 strokes at 4 lb. weight. A stroke is one back and forth cycle. Results are reported as a percentage of ink removal.

For the wet rub tests, a wet felt pad was attached to the top (receptor) rubber pad of the rub tester. The felt pad was wet with one of water, vegetable oil, or ketchup. The rub tester was set to perform 10 strokes at 2 lb. weight. The results are reported as a percentage of ink removal.

Cotton Bud Rubs

The proof print was laid print side up on a hard surface. The cotton bud was immersed in the specified liquid (alcohol, cola, or lemonade), and then immediately rubbed on the surface of the print for 10 rubs, wherein each rub is a single rub in one direction. The results are reported as a percentage of ink removal.

Materials

Erkamar 3275=renewable maleic resin (Kraemer) (also Erkamar 3300 and 3270 from Kraemer)

Joncryl 662=an acrylic emulsion comprising 50% renewable raw materials on solids (BASF)

Neocryl XK14=self-crosslinking acrylic emulsion (DSM Coating Resins, LLC)

Joncryl 8052=styrene-acrylic copolymer emulsion (coalescent) (BASF)

Fluxair 85S=a liquid defoamer based on vegetable oils (Keyser & Mackay?)

DC209S=high molecular weight polydimethylsiloxane emulsion (Dow; now Xiameter)

Aquacer 531=non-ionic emulsion of modified polyethylene wax

Cravallac WW1001=water-based high density polyethylene wax dispersion

Tego Foamex 1488=emulsion of polyether siloxane copolymer

DynWet 800=alcohol alkoxylate wetting agent for aqueous inks, coatings, etc.

DPA 1480=commercially available corn starch based ink (Sun)

Aquathene PC1=commercially available standard acrylic based ink (Sun)

HydroRez 3886=renewable fumaric resin (Lawter) (also HydroRez 6200 and 6500 from Lawter)

Reactol 5145A=renewable polyester resin (Lawter)

EXAMPLE 1

Technical Varnish Formulations

A varnish (Varnish 1) comprising a renewable maleic resin, obtained from gum rosin feedstock, was prepared according to the formulation in Table 1. The resin content of the Varnish 1 is 100% renewable.

TABLE 1

Varnish 1: Renewable maleic varnish (100% renewable resin in dried ink film)

| Material | % | % Solids | % Renewable in formulation |
|---|---|---|---|
| Water | 57.9 | | |
| Erkamar 3275-Renewable Maleic resin | 32.0 | 100 | 32 |
| Biocide | 0.2 | | |
| Ammonia solution | 9.8 | | |
| Fluxair 85S | 0.1 | | |
| Total | 100.0 | | |

The renewable maleic resin, Erkamar 3275 was obtained from Kraemer. Other renewable maleic resins could also be used, such as Erkamar 3300 and 3270 (from Kraemer). Other types of renewable resins could also be used, such as, for example Reactol 5145A (polyester), and HydroRez 3886, 6200, and 6500 (fumarics) from Lawter. The present invention is not limited to these renewable resins, and any suitable renewable resin could be used.

An acrylic varnish, Varnish 2, comprising 50% renewable resin was prepared according to the formula in Table 2.

TABLE 2

Varnish 2: Acrylic varnish with 50% renewable resin

| Material | % | % Solids | % Renewable in formulation |
|---|---|---|---|
| Water | 66.9 | | |
| Joncryl 662 (Acrylic emulsion) | 30.0 | 40 | 6 |
| Ammonia solution | 3.0 | | |
| Fluxair 85S | 0.1 | | |
| Total | 100.0 | | |

A varnish comprising a non-renewable, self-crosslinking acrylic, Varnish 3, was prepared according to the formulation in Table 3. It is available as Aquathene PB4 varnish (Sun Chemical).

TABLE 3

Varnish 3: non-renewable self-crosslinking acrylic resin

| Material | % | % Solids | % Renewable in formulation |
|---|---|---|---|
| Neocryl XK14 Acrylic emulsion | 61.3 | 40 | 0 |
| Joncryl 8052 | 12.4 | 46 | 0 |
| N-Propanol | 4.0 | | |
| Aquacer 531 | 9.7 | | |
| Crayvallac WW1001 | 7.8 | | |
| Tego Foamex 1488 | 0.4 | | |
| DynWet 800 | 1.9 | | |
| DC209S | 2.0 | | |
| Urea | 0.5 | | |
| Total | 100.0 | | |

EXAMPLE 2

Inventive Inks 1 to 3

Inventive inks 1 to 3 were prepared according to the formulations in Table 4. The pigments used were Yellow 13, Orange 34, Red 122, Red 184, Red 266, Black 15:3, Violet 23, Green 7, and Blue 15:3.

TABLE 4

Inks 1 to 3 formulations

| Materials | Ink 1 Yellow wt % | % RS | % RNW | Ink 2 Red wt % | % RS | % RNW | Ink 3 Purple wt % | % RS | % RNW |
|---|---|---|---|---|---|---|---|---|---|
| Yellow Base | 18.0 | 0.92 | 0 | — | | | 1.4 | 0.07 | 0 |
| Orange Base | 0.9 | 0.15 | 0 | 13.5 | 0.69 | 0 | — | | |
| Red Base | — | | | 20.0 | 1.03 | 0 | 5.9 | 0.3 | 0 |
| Violet Base | — | | | — | | | 20.7 | 1.06 | 0 |
| Varnish 1 | 34.2 | 10.94 | 100 | 35.1 | 11.23 | 100 | 35.1 | 11.23 | 100 |
| Varnish 2 | 24.2 | 2.90 | 50 | 8.1 | 0.97 | 50 | 13.6 | 1.63 | 50 |
| Varnish 3 | 13.8 | 3.37 | 0 | 14.2 | 3.47 | 0 | 14.2 | 3.47 | 0 |
| DC209S (silicone) | 0.9 | | | 0.9 | | | 0.9 | | |
| Zinc Oxide Solution | 2.8 | | | 2.8 | | | 2.8 | | |
| Fluxair 85S (defoamer) | 0.2 | | | 0.2 | | | 0.2 | | |
| Water | 5.0 | | | 5.2 | | | 5.2 | | |
| Total | 100.0 | 18.28 | | 100.0 | 17.39 | | 100.0 | 17.76 | |
| Total % RNW | | | 67.8 | | | 67.4 | | | 67.8 | wt % = amount of material as a percentage (w/w), based on the total weight of the composition
% RS = percentage of resin solids in the formulation, based on the total weight of the composition
% RNW = percentage of renewable resin in the material
Total % RNW = sum of [(% RS) × (% RNW)] for each material, divided by Total % RS, then multiplied by 100

The properties of Ink 1 to Ink 3, and two comparative inks, were tested as described above. Comparative ink 1 (Comp. 1) is a standard acrylic based ink commercially from Sun Chemical (Aquathene PC1) that does not contain renewable materials. Comparative ink 2 (Comp. 2) is a corn starch based ink commercially available from Sun Chemical (DPA 1480). The results are shown in Table 5.

TABLE 5

Properties of Inks 1 to 3, and Comp. 1 and 2 inks

| Test | Comp. 1 | Comp. 2 | Ink 1 | Ink 2 | Ink 3 |
|---|---|---|---|---|---|
| Tape adhesion (% removal) | 0 | 20 | 0 | 0 | 0 |
| Wet SATRA 2 psi weight rub resistance, water (# rubs to removal) | 50 | 8 | 80 | 80 | 80 |
| SATRA rub resistance 30 Squalene (artificial sweat) (% removal) | 100 | 100 | 50 | 50 | 50 |
| ASTM 5264 dry rub (100 strokes, 4 lb. weight) (% removal) | 0 | 0 | 0 | 0 | 0 |
| ASTM 5264 wet rub, (10 strokes, 2 lb. weight), Water (% removal) | 0 | 20 | 0 | 0 | 0 |
| ASTM wet rub, (10 strokes, 2 lb. weight), Vegetable oil (% removal) | 0 | 20 | 0 | 0 | 0 |
| ASTM wet rub, (10 strokes, 2 lb. weight), Ketchup (% removal) | 0 | 20 | 0 | 0 | 0 |
| 10 Cotton bud rubs, with cola & lemonade (% removal) | 0 | 40 | 0 | 0 | 0 |
| 10 Cotton bud rubs with alcohol (% removal) | 20 | 100 | 5 | 5 | 5 |

The data in Table 5 show that the inventive inks, containing renewable gum rosin resins, perform as well as or better than a standard acrylic ink not containing renewable materials, and generally perform better than an ink based on renewable corn starch as the binder.

EXAMPLE 3

Effect of Removing Specific Components from the Formulation

Inks 1A to 1C were prepared similarly to Ink 1, except that specific components were not included. Ink 1A was prepared similarly to Ink 1, except that no self-crosslinking acrylic emulsion was included. Ink 1B was prepared similarly to Ink 1, except that no silicone was included. Ink 1C was prepared similarly to Ink 1, except that no zinc oxide was included. The inks were tested as described above. The results are shown in Table 6.

TABLE 6

Properties of inks 1A to 1C

| Test | Ink 1A | Ink 1B | Ink 1C |
|---|---|---|---|
| Tape adhesion (% removal) | 0 | 0 | 0 |
| Wet SATRA 2 psi weight rub resistance, water (# rubs to removal) | 20 | 20 | 20 |
| SATRA 30 rub resistance Squalene (artificial sweat) (% removal) | 100 | 100 | 100 |
| ASTM 5264 dry rub (100 strokes, 4 lb. weight) (% removal) | 0 | 0 | 0 |
| ASTM 5264 wet rub, (10 strokes, 2 lb. weight), Water (% removal) | 30 | 30 | 40 |
| ASTM 5264 wet rub, (10 strokes, 2 lb. weight), Vegetable oil (% removal) | 30 | 30 | 30 |
| ASTM 5264 wet rub, (10 strokes, 2 lb. weight), Ketchup (% removal) | 40 | 50 | 40 |
| 10 Cotton bud rubs, with cola & lemonade (% removal) | 20 | 30 | 20 |
| 10 Cotton bud rubs with alcohol (% removal) | 20 | 20 | 20 |

The data in Table 6 show that inks perform better when all four claimed components (renewable resin, self-crosslinking acrylic, crosslinking agent, and silicone) are present in the ink.

EXAMPLE 4

Inks 4 and 5 Prepared Using Fumaric and Polyester Renewable Resins

Yellow Inks 4 and 5 were prepared similarly to Ink 1, except that different renewable resins were used instead of Varnish 1 (maleic resin). In Ink 4, the renewable resin was HydroRez 3886, a renewable fumaric resin (from Lawter). Ink 5 contained Reactol 5145A, a renewable polyester resin (from Lawter).

Inks 4 and 5 were tested as described above, and compared to Ink 1. The results are shown in Table 7.

TABLE 7

Properties of Inks 4 and 5

| Test | Ink 1 | Ink 4 | Ink 5 |
|---|---|---|---|
| Tape adhesion (% removal) | 0 | 0 | 0 |
| Wet SATRA 2 psi weight rub resistance, water (# rubs to removal) | 80 | 80 | 80 |
| SATRA rub resistance 30 Squalene (artificial sweat) (% removal) | 50 | 50 | 50 |
| ASTM 5264 dry rub (100 strokes, 4 lb. weight) (% removal) | 0 | 0 | 0 |
| ASTM 5264 wet rub, (10 strokes, 2 lb. weight), Water (% removal) | 0 | 0 | 0 |
| ASTM wet rub, (10 strokes, 2 lb. weight), Vegetable oil (% removal) | 0 | 0 | 0 |
| ASTM wet rub, (10 strokes, 2 lb. weight), Ketchup (% removal) | 0 | 0 | 0 |
| 10 Cotton bud rubs, with cola & lemonade (% removal) | 0 | 0 | 0 |
| 10 Cotton bud rubs with alcohol (% removal) | 5 | 5 | 5 |

The data in Table 7 show that renewable fumaric or polyester resins perform as well as renewable maleic resin.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A water based ink or coating composition comprising:
    a) one or more renewable resins;
    b) one or more self-crosslinking acrylic resins;
    c) one or more crosslinking agents;
    d) silicone; and
    e) 0% (w/w) to 15% (w/w) one or more colorants, based on the total weight of the ink or coating composition;
wherein the content of the one or more renewable resins is equal to or greater than 65% (w/w), based on the total weight of the resin content in the ink or coating composition;
wherein the total resin content is 5% (w/w) to 50% (w/w), based on the total weight of the ink or coating composition; and
wherein the crosslinking agents are selected from the group consisting of zinc oxide, carbodiimide, cupric oxide, magnesium oxide, calcium oxide, glutaraldehyde, glyoxal, potassium persulfate, aluminum chloride, titanium tetrahydrochloride, zinc chloride, and combinations.

2. The ink or coating composition of claim 1, wherein at least one renewable resin is a renewable gum rosin.

3. The ink or coating composition of claim 2, wherein the renewable gum rosin resin comprises one or more maleic resins, or one or more fumaric resins, or one or more polyester resins, or combinations thereof.

4. The ink or coating composition of claim 1, wherein the self-crosslinking acrylics are present in an amount of 0.05% (w/w) to 20% (w/w), based on the total weight of the ink or coating composition.

5. The ink or coating composition of claim 1, wherein the crosslinking agent is selected from the group consisting of zinc oxide, carbodiimide, and combinations thereof.

6. The ink or coating composition of claim 1, wherein at least one crosslinking agent is zinc oxide.

7. The ink or coating composition of claim 1, wherein the crosslinking agents are present in an amount of 0.5% (w/w) to 6% (w/w), based on the total weight of the ink or coating composition.

8. The ink or coating composition of claim 1, wherein the silicone is in the form of a silicone emulsion.

9. The ink or coating composition of claim 1, wherein the silicone is present in an amount of 0.5% (w/w) to 2% (w/w), based on the total weight of the ink or coating composition.

10. The ink or coating composition of claim 1, comprising 6% (w/w) to 15% (w/w) one or more colorants, based on the total weight of the composition.

11. The ink or coating composition of claim 1 further comprising one or more additives selected from the group consisting of adhesion promoters, light stabilizers, de-gassing additives, waxes, ammonia, flow promoters, defoamers, antioxidants, stabilizers, surfactants, dispersants, plasticizers, rheological additives, and combinations thereof.

12. The ink or coating composition of claim 1, further comprising one or more coalescents.

13. The ink or coating composition of claim 12, wherein the coalescents comprise an acrylic with a glass transition temperature (Tg) less than 20° C.

14. A substrate comprising the ink or coating composition of claim 1.

15. An article comprising the substrate of claim 14.

16. The article of claim 15, wherein the article is a packaging article.

17. The article of claim 16, wherein the packaging article is suitable for food packaging applications.

18. The article of claim 15, wherein the article is suitable for beverage cups.

19. The ink or coating composition of claim 1, wherein the crosslinking agents are selected from the group consisting of zinc oxide, carbodiimide, cupric oxide, magnesium oxide, calcium oxide, potassium persulfate, aluminum chloride, titanium tetrahydrochloride, zinc chloride, and combinations thereof.

20. The ink or coating composition of claim 1, wherein the silicone is present in an amount of 0.5% (w/w) to 1% (w/w), based on the total weight of the ink or coating composition.

21. The ink or coating composition of claim 1, wherein the total resin content is 15% (w/w) to 20% (w/w), based on the total weight of the ink or coating composition.

22. The ink or coating composition of claim 1, wherein the content of the one or more renewable resins is 65% (w/w) to 70% (w/w), based on the total weight of the resin content in the ink or coating composition.

* * * * *